United States Patent
S-V et al.

(10) Patent No.: US 9,355,456 B2
(45) Date of Patent: May 31, 2016

(54) METHOD, APPARATUS AND COMPUTER PROGRAM PRODUCT FOR COMPENSATING EYE COLOR DEFECTS

(75) Inventors: Basavaraja S-V, Bangalore (IN); Krishna Govindarao, Bangalore (IN); Veldandi Muninder, Bangalore (IN); Pranav Mishra, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 440 days.

(21) Appl. No.: 13/807,551

(22) PCT Filed: May 17, 2011

(86) PCT No.: PCT/FI2011/050445
§ 371 (c)(1),
(2), (4) Date: Jul. 15, 2013

(87) PCT Pub. No.: WO2012/001220
PCT Pub. Date: Jan. 5, 2012

(65) Prior Publication Data
US 2013/0308857 A1    Nov. 21, 2013

(30) Foreign Application Priority Data
Jun. 28, 2010    (IN) .......................... 1818/CHE/2010

(51) Int. Cl.
*G06K 9/00*    (2006.01)
*G06T 7/00*    (2006.01)
(Continued)

(52) U.S. Cl.
CPC ............ *G06T 7/0079* (2013.01); *G06K 9/0061* (2013.01); *G06T 7/0081* (2013.01); *G06T 7/408* (2013.01); *H04N 1/624* (2013.01);
(Continued)

(58) Field of Classification Search
None
See application file for complete search history.

(56) References Cited

U.S. PATENT DOCUMENTS

| | | | |
|---|---|---|---|
| 6,016,354 A * | 1/2000 | Lin et al. | 382/117 |
| 7,088,855 B1 * | 8/2006 | Vide | 382/167 |
| 7,239,726 B2 * | 7/2007 | Li | 382/118 |

(Continued)

FOREIGN PATENT DOCUMENTS

| CN | 101309342 A | 11/2008 |
|---|---|---|
| CN | 101551901 A | 10/2009 |

(Continued)

OTHER PUBLICATIONS

Office Action for Korean Application No. 10-2012-7034361 dated Feb. 26, 2014.

(Continued)

*Primary Examiner* — Wenpeng Chen
(74) *Attorney, Agent, or Firm* — Alston & Bird LLP

(57) ABSTRACT

A red-eye detection and correction method includes computing a first difference image based on a difference between red pixel intensity and green pixel intensity of a set of pixels. The set of pixels are associated with a first eye region of an image. The method further includes processing the first difference image for computing at least one gradient and at least one projection associated with the at least one gradient. Furthermore, the method includes determining at least one central point based on the at least one projection; and thereafter computing the first eye color defect region based on the at least one central point and a plurality of red pixels of the set of pixels. The method also includes mapping an eye color defect location information computed from a low resolution image to be applicable on the original high resolution image, thereby avoiding recomputation.

21 Claims, 8 Drawing Sheets

(51) Int. Cl.
 *G06T 7/40* (2006.01)
 *H04N 1/62* (2006.01)
(52) U.S. Cl.
 CPC ............... *G06T2207/10024* (2013.01); *G06T 2207/20068* (2013.01); *G06T 2207/30216* (2013.01)

(56) References Cited

U.S. PATENT DOCUMENTS

| | | |
|---|---|---|
| 7,310,443 B1 | 12/2007 | Kris et al. |
| 2002/0126901 A1* | 9/2002 | Held .............................. 382/199 |
| 2004/0114829 A1 | 6/2004 | LeFeuvre et al. |
| 2004/0213476 A1 | 10/2004 | Luo et al. |
| 2005/0105827 A1* | 5/2005 | Yonaha et al. ................ 382/291 |
| 2005/0140801 A1 | 6/2005 | Prilutsky et al. |
| 2005/0276481 A1* | 12/2005 | Enomoto ...................... 382/190 |
| 2005/0286799 A1* | 12/2005 | Huang et al. .................. 382/275 |
| 2006/0033831 A1* | 2/2006 | Ejima et al. ............... 348/333.01 |
| 2006/0204052 A1* | 9/2006 | Yokouchi ...................... 382/117 |
| 2006/0257132 A1 | 11/2006 | Shiffer et al. |
| 2006/0280362 A1* | 12/2006 | Umeda .......................... 382/167 |
| 2006/0280363 A1* | 12/2006 | Umeda .......................... 382/167 |
| 2007/0140556 A1 | 6/2007 | Willamowski et al. |
| 2007/0140589 A1* | 6/2007 | Umeda .......................... 382/275 |
| 2008/0137944 A1* | 6/2008 | Marchesotti et al. ......... 382/167 |
| 2008/0226175 A1* | 9/2008 | Suzuki et al. ................. 382/190 |
| 2009/0067682 A1* | 3/2009 | Ohk et al. ..................... 382/118 |
| 2009/0087100 A1* | 4/2009 | Hu ................................. 382/190 |
| 2009/0103784 A1* | 4/2009 | Forutanpour ................. 382/117 |
| 2010/0183225 A1* | 7/2010 | Vantaram et al. ............. 382/173 |
| 2010/0290668 A1* | 11/2010 | Friedman et al. ............. 382/103 |
| 2010/0303345 A1* | 12/2010 | Reid et al. ..................... 382/163 |
| 2011/0080616 A1* | 4/2011 | Yang et al. ................... 358/3.26 |

FOREIGN PATENT DOCUMENTS

| | | | | |
|---|---|---|---|---|
| CN | 101620679 A | | 1/2010 | |
| JP | 2005149217 A | * | 6/2005 | ............... G06T 1/00 |
| JP | 2008250811 A | * | 10/2008 | |

OTHER PUBLICATIONS

Office Action for Russian Application No. 2013013431 dated May 17, 2014.
International Preliminary Report on Patentability/Written Opinion for Application No. PCT/FI2011/050445 dated Dec. 28, 2012.
International Search Report for Application No. PCT/FI2011/050445, dated Sep. 5, 2011.
Office Action for Chinese Application No. 201180039023.8 dated Apr. 14, 2015.
Office Action for Chinese Application No. 201180039023 8 dated Nov. 3, 2015.

* cited by examiner

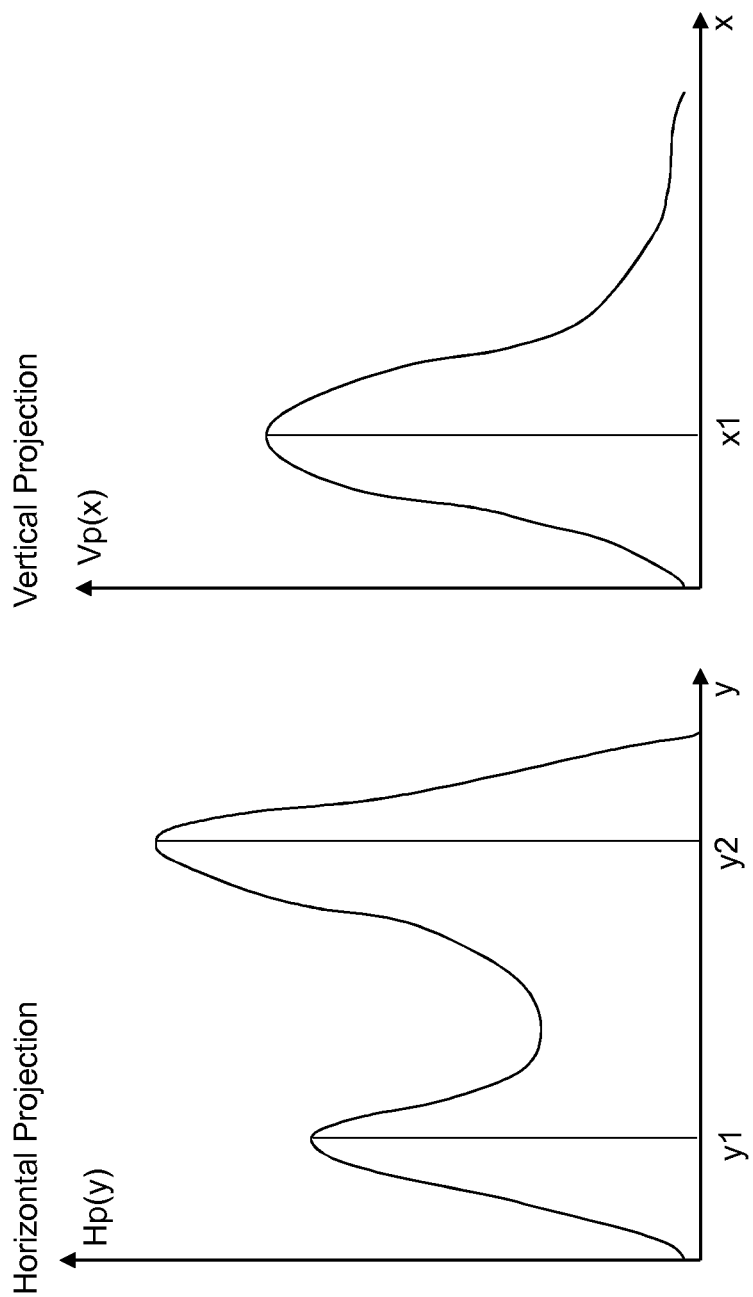

METHOD, APPARATUS AND COMPUTER PROGRAM PRODUCT FOR COMPENSATING EYE COLOR DEFECTS

TECHNICAL FIELD

Various implementations relate generally to method, apparatus, and computer program product for compensating eye color defects.

BACKGROUND

Eye color defect phenomenon (for example red eyes) is usually observed in images captured in low ambient illumination conditions. Typically, in low ambient illumination conditions, flashlight of an image-capturing device (such as a camera) is reflected by pupils of eyes of a subject that often results in unnatural reddening of a pupil region in an image. In certain cases, the eyes of the subjects may appear in other reddish shades, such as golden, orange and the like. Occurrence of the eye color defect phenomenon may be attributed to various other factors also, such as a small angle between the flashlight of the image capturing device and the lens thereof, proximity of the subject to the image capturing device, and the like.

Typically, in order to avoid appearance of the red eyes in the images, image capturing devices are utilized that may include a secondary lamp or light that is flashed prior to capturing the image. The secondary lamp exposes the subject's eyes to light for few seconds before exposure to the actual flashlight, thereby giving the pupils enough time to contract. In some instances, instead of one full flash, the image-capturing device provides multiple pre-flashes that may produce the same effect as produced by single flash of the secondary lamp. However, such image capturing devices may introduce a time delay between a first flash and actual capturing of the image, due to which the subject may deviate from a posed position before the actual image is captured.

In some cases, user intervention may be required in correcting the eye color defect phenomenon in the images by processing the captured image to remove the color defects from the eyes. However, such user intervention in identifying and removing eye color defects may prove cumbersome and inefficient. Furthermore, such devices may often miss other known eye color defects of different hues and intensities such as golden eyes, orange eyes and the like.

SUMMARY OF SOME EMBODIMENTS

Various aspects of examples of the invention are set out in the claims.

In a first aspect, there is provided a method comprising: computing a first difference image based on a difference between red pixel intensity and green pixel intensity of a set of pixels, the set of pixels being associated with a first eye region of an image; processing the first difference image for computing at least one gradient and at least one projection associated with the at least one gradient; determining at least one central point based on the at least one projection; and computing the first eye color defect region based on the at least one central point and a plurality of red pixels of the set of pixels.

In a second aspect, there is provided a method comprising: determining a first eye color defect region in a low resolution (LR) image, the LR image being produced from a high resolution (HR) image; determining an eye color defect information for the LR image, the eye color defect information comprising a set of identifiers associated with a plurality of first peripheral portions of the first eye color defect region in the LR image; mapping the eye color defect information computed from the LR image to be applicable on the HR image, wherein the HR image comprises a second eye color defect region corresponding to the first eye color defect region in the LR image, and a plurality of second peripheral portions of the second eye color defect region corresponding to a plurality of first peripheral portions of the first eye color defect region; and processing the HR image to identify an eye color defect in at least one of the plurality of the second peripheral portions based on the set of identifiers.

In a third aspect, there is provided an apparatus comprising: at least one processor; and at least one memory comprising computer program code, the at least one memory and the computer program code configured to, with the at least one processor, cause the apparatus at least to perform: compute a first difference image based on a difference between red pixel intensity and green pixel intensity of a set of pixels, the set of pixels being associated with a first eye region of an image; process the first difference image for computing at least one gradient and at least one projection associated with the at least one gradient; determine at least one central point based on the at least one projection; and compute the first eye color defect region based on the at least one central point and a plurality of red pixels of the set of pixels.

In a fourth aspect, there is provided an apparatus comprising: at least one processor and at least one memory comprising computer program code, the at least one memory and the computer program code configured to, with the at least one processor, cause the apparatus at least to: determine a first eye color defect region in a low resolution (LR) image, the LR image being produced from a high resolution (HR) image; determine an eye color defect information for the LR image, the eye color defect information comprising a set of identifiers associated with a plurality of first peripheral portions of the first eye color defect region in the LR image; mapping the eye color defect information computed from the LR image to be applicable on the HR image, wherein the HR image comprises a second eye color defect region corresponding to the first eye color defect region in the LR image, and a plurality of second peripheral portions of the second eye color defect region corresponding to a plurality of first peripheral portions of the first eye color defect region; and process the HR image to identify an eye color defect in at least one of the plurality of the second peripheral portions based on the set of identifiers.

In a fifth aspect, there is provided a computer program product comprising: at least one computer-readable storage medium, the computer-readable storage medium comprising a set of instructions, which, when executed by one or more processors, cause an apparatus to at least perform computing a first difference image based on a difference between red pixel intensity and green pixel intensity of a set of pixels, the set of pixels being associated with a first eye region of an image; processing the first difference image for computing at least one gradient and at least one projection associated with the at least one gradient; determining at least one central point based on the at least one projection; and computing the first eye color defect region based on the at least one central point and a plurality of red pixels of the set of pixels.

In a sixth aspect, there is provided a computer program product comprising: at least one computer-readable storage medium, the computer-readable storage medium comprising a set of instructions, which, when executed by one or more processors, cause an apparatus to at least perform: determining a first eye color defect region in a low resolution (LR) image, the LR image being produced from a high resolution (HR) image; determining an eye color defect information for the LR image, the eye color defect information comprising a set of identifiers associated with a plurality of first peripheral portions of the first eye color defect region in the LR image; mapping the eye color defect information from the LR image to be applicable on the HR image, wherein the HR image comprises a second eye color defect region corresponding to the first eye color defect region in the LR image, and a plurality of second peripheral portions of the second eye color defect region corresponding to a plurality of first peripheral portions of the first eye color defect region; and processing the HR image to identify an eye color defect in at least one of the plurality of the second peripheral portion based on the set of identifiers.

In a seventh aspect, there is provided an apparatus comprising: means for computing a first difference image based on a difference between red pixel intensity and green pixel intensity of a set of pixels associated with a first eye region of an image; means for processing the first difference image for computing at least one gradient and at least one projection associated with the at least one gradient; means for determining at least one central point based on the at least one projection; and means for computing the first eye color defect region based on the at least one central point and a plurality of red pixels of the set of pixels.

In an eighth aspect, there is provided an apparatus comprising: means for determining a first eye color defect region in a low resolution (LR) image, wherein the LR image is produced from a high resolution (HR) image; means for determining a set of identifiers associated with a plurality of first peripheral portions of the first eye color defect region in the LR image; means for mapping the eye color defect information from the LR image to be applicable to the HR image, wherein the HR image comprises a second eye color defect region corresponding to the first eye color defect region in the LR image, and a plurality of second peripheral portions of the second eye color defect region corresponding to a plurality of first peripheral portions of the first eye color defect region; and means for processing the HR image to identify an eye color defect in at least one of the plurality of the second peripheral portions based on the set of identifiers.

In a ninth aspect, there is provided a method comprising: computing a first difference image based on a squared difference between red pixel intensity and a maximum of green pixel and blue pixel intensities of a set of pixels, the set of pixels being associated with a first eye region of an image; processing the first difference image for computing at least one gradient and at least one projection associated with the at least one gradient; determining at least one central point based on the at least one projection; and computing the first eye color defect region based on the at least one central point and a plurality of red pixels of the set of pixels.

In a tenth aspect, there is provided an apparatus comprising: at least one processor; and at least one memory comprising computer program code, the at least one memory and the computer program code configured to, with the at least one processor, cause the apparatus at least to: compute a first difference image based on a squared difference between red pixel intensity and a maximum of green pixel and blue pixel intensities of a set of pixels, the set of pixels being associated with a first eye region of an image; process the first difference image for computing at least one gradient and at least one projection associated with the at least one gradient; determine at least one central point based on the at least one projection; and compute the first eye color defect region based on the at least one central point and a plurality of red pixels of the set of pixels.

In an eleventh aspect, there is provided a computer program comprising a set of instructions, which, when executed by one or more processors, cause an apparatus to at least perform to computing a first difference image based on a difference between red pixel intensity and green pixel intensity of a set of pixels, the set of pixels being associated with a first eye region, processing the first difference image for computing at least one gradient and at least one projection associated with the at least one gradient, determining at least one central point based on the at least one projection; and computing the first eye color defect region based on the at least one central point and a plurality of red pixels of the first set of pixels.

BRIEF DESCRIPTION OF THE FIGURES

For a more complete understanding of example embodiments of the present invention, reference is now made to the following descriptions taken in connection with the accompanying drawings in which:

FIGS. 5A and 5B illustrate a horizontal projection and a vertical projection associated with at least one gradient in accordance with another example embodiment;

DETAILED DESCRIPTION

Example embodiments and their potential advantages are understood by referring to FIG. 1 through FIG. 8 of the drawings.

Figure 1:
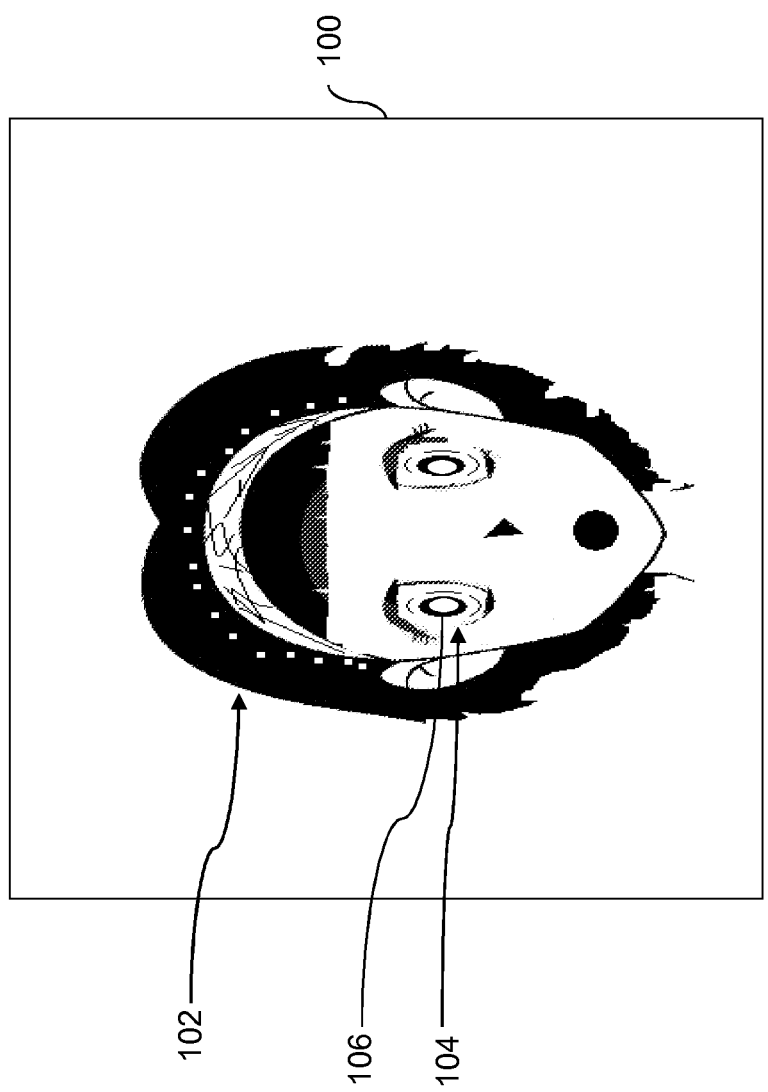
FIG. 1 is a schematic diagram of a digital image illustrating an eye color defect in accordance with an example embodiment.

FIG. 1 is a schematic diagram of a digital image illustrating an eye color defect in accordance with an example embodiment. In FIG. 1, an image 100 depicting a human face 102 is illustrated. The face 102 is shown to include eyes such as an eye 104. Each of the eyes includes a pupil, an iris and sclera. It may be assumed that the eyes of the human face 102 exhibits an eye color defect phenomenon, and accordingly the pupil 106 thereof may appear in one of the shades of red color, for example, deep red color, golden color, orange color, and the like. For the purpose of illustrating the eye color defect phenomenon in FIG. 1, the pupil 106 of the eye 104 is shown to assume a lighter color instead of black color. The eye color defect phenomenon is also known as red eye, accordingly, in the present description the terms 'red eye' and 'eye color defect' may be used interchangeably.

As described herein, the image 100 may be captured by using an image capturing apparatus, for example a camera. Other examples of the image capturing apparatus may include, but are not limited to, a film camera, a digital camera, a video camera, a camera in a mobile phone, or any other a multimedia device having image capturing capabilities. The camera may capture an image using a flash configured thereon that may potentially cause eye color defects, as shown in FIG. 1, in the captured image of a subject. As disclosed herein, the images captured by the camera may be analyzed for eye color defects, and thereafter compensated. The eye color defect detection may be performed by the image capturing device or, alternatively the captured images may be transferred to a computing device that is capable of detecting eye color defects. Such methods, apparatus and computer program products for compensating eye color defects are described in detail in conjunction with FIGS. 1 through 8.

Figure 2:
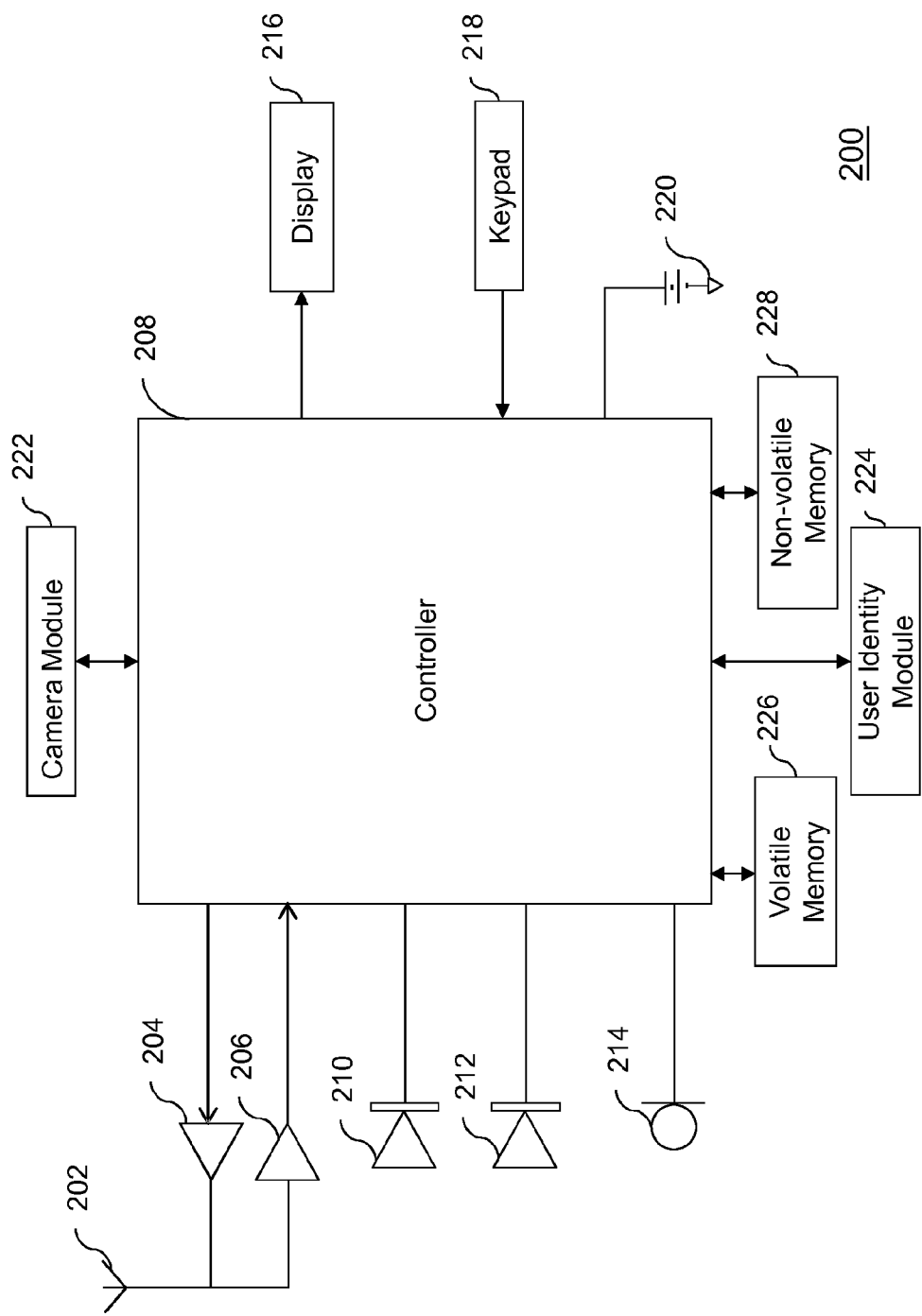
FIG. 2 illustrates a device in accordance with an example embodiment.

FIG. 2 illustrates a device 200 in accordance with an example embodiment. It should be understood, however, that the device 200 as illustrated and hereinafter described is merely illustrative of one type of device that may benefit from various embodiments, therefore, should not be taken to limit the scope of the embodiments. As such, it should be appreciated that at least some of the components described below in connection with the device 200 may be optional and thus in an example embodiment may include more, less or different components than those described in connection with the example embodiment of FIG. 2. The device 200 of FIG. 2 could be any of a number of types of mobile electronic devices, for example, portable digital assistants (PDAs), mobile televisions, gaming devices, cellular phones, all types of computers (for example, laptops, mobile computers or desktops), cameras, media players, mobile digital assistants, or any combination of the aforementioned, and other types of multimedia devices.

The device 200 may include an antenna 202 (or multiple antennas) in operable communication with a transmitter 204 and a receiver 206. The device 200 may also include an apparatus, such as a controller 208 or other processing device that provides signals to and receives signals from the transmitter 204 and the receiver 206, respectively. The signals may include signaling information in accordance with the air interface standard of the applicable cellular system, and/or may also include data corresponding to user speech, received data and/or user generated data. In this regard, the device 200 may be capable of operating with one or more air interface standards, communication protocols, modulation types, and access types. By way of illustration, the device 200 may be capable of operating in accordance with any of a number of first, second, third and/or fourth-generation communication protocols or the like. For example, the device 200 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 200 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 208 may include circuitry implementing, among others, audio and logic functions of the device 200. For example, the controller 208 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 200 are allocated between these devices according to their respective capabilities. The controller 208 thus may also include the functionality to convolutionally encode and interleave message and data prior to modulation and transmission. The controller 208 may additionally include an internal voice coder, and may include an internal data modem. Further, the controller 208 may include functionality to operate one or more software programs, which may be stored in a memory. For example, the controller 208 may be capable of operating a connectivity program, such as a conventional Web browser. The connectivity program may then allow the device 200 to transmit and receive Web content, such as location-based content and/or other web page content, according to a Wireless Application Protocol (WAP), Hypertext Transfer Protocol (HTTP) and/or the like, for example. In an example embodiment, the controller 208 may be embodied as a multi-core processor such as a dual or quad core processor. However, any number of processors may be included in the controller 208.

The device 200 may also comprise a user interface including an output device such as a ringer 210, an earphone or speaker 212, a microphone 214, a display 216, and a user input interface, which may be coupled to the controller 208. The user input interface, which allows device 200 to receive data, may include any of a number of devices allowing the device 200 to receive data, such as a keypad 218, a touch display, a microphone or other input device. In embodiments including the keypad 218, the keypad 218 may include numeric (0-9) and related keys (#, *), and other hard and soft keys used for operating the device 200. Alternatively, the keypad 218 may include a conventional QWERTY keypad arrangement. The keypad 218 may also include various soft keys with associated functions. In addition, or alternatively, the device 200 may include an interface device such as a joystick or other user input interface. The device 200 further includes a battery 220, such as a vibrating battery pack, for powering various circuits that are used to operate the device 200, as well as optionally providing mechanical vibration as a detectable output.

In an example embodiment, the device 200 includes an image capturing element, such as a camera, video and/or audio module, in communication with the controller 208. The image capturing element may be any means for capturing an image, for storage, display or transmission. In an example embodiment in which the image capturing element is a camera module 222, the camera module 222 may include a digital camera capable of forming a digital image file from a captured image. As such, the camera module 222 includes all hardware, such as a lens or other optical component(s), and software necessary for creating a digital image file from a captured image. Alternatively, the camera module 222 may include only the hardware needed to view an image, while a memory device of the device 200 stores instructions for execution by the controller 208 in the form of software to create a digital image file from a captured image. In an example embodiment, the camera module 222 may further include a processing element such as a co-processor which assists the controller 208 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 222 may provide live image data to the display 216. Moreover, in an example embodiment, the display 216 may be located on one side of the device 200 and the camera module 222 may include a lens positioned on the opposite side of the device 200 with respect to the display 216 to enable the camera module 222 to capture images on one side of the device 200 and present a view of such images to the user positioned on the other side of the device 200.

The device 200 may further include a user identity module (UIM) 224. The UIM 224 may be a memory device having a processor built in. The UIM 224 may include, for example, a subscriber identity module (SIM), a universal integrated circuit card (UICC), a universal subscriber identity module (USIM), a removable user identity module (R-UIM), or any other smart card. The UIM 224 typically stores information elements related to a mobile subscriber. In addition to the UIM 224, the device 200 may be equipped with memory. For example, the device 200 may include volatile memory 226, such as volatile Random Access Memory (RAM) including a cache area for the temporary storage of data. The device 200 may also include other non-volatile memory 228, which may be embedded and/or may be removable. The non-volatile memory 228 may additionally or alternatively comprise an electrically erasable programmable read only memory (EE-PROM), flash memory, hard drive, or the like. The memories may store any of a number of pieces of information, and data, used by the device 200 to implement the functions of the device 200.

Figure 3:
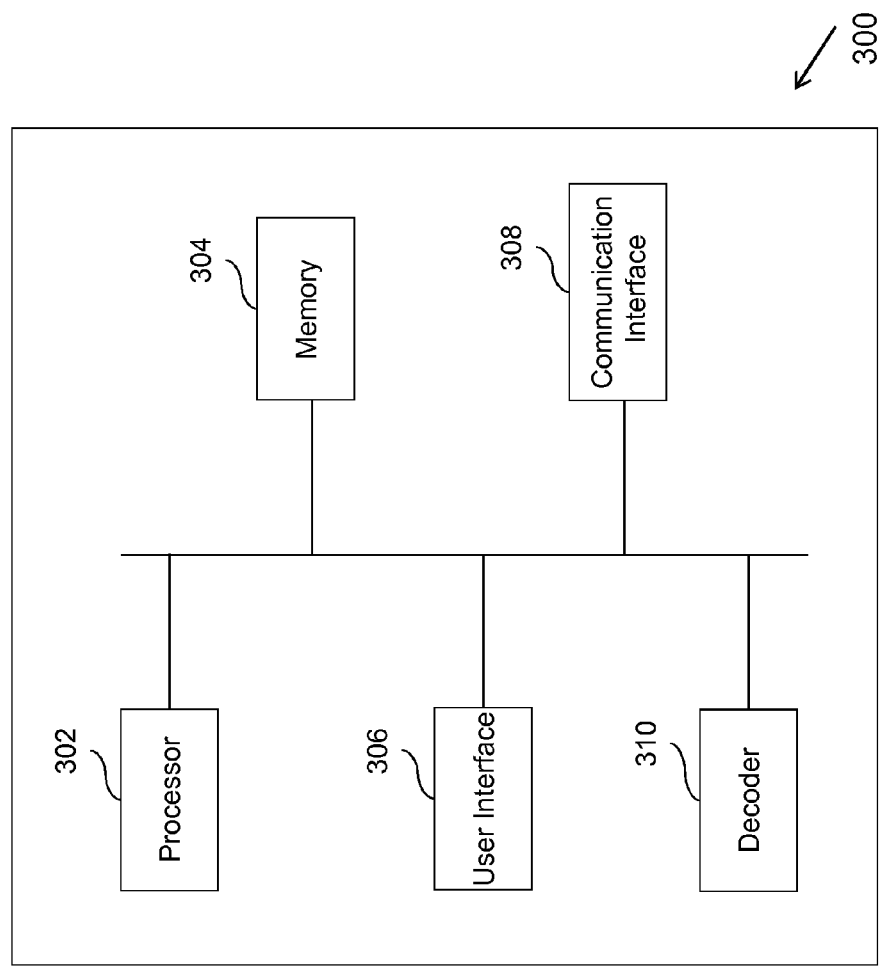
FIG. 3 illustrates an apparatus in accordance with an example embodiment.

FIG. 3 illustrates an apparatus 300 in accordance with an example embodiment. The apparatus 300 may be employed, for example, in the device 200 of FIG. 2. However, it should be noted that the device 200, may also be employed on a variety of other apparatuses both mobile and fixed, and therefore, embodiments should not be limited to application on device such as the device 200 of FIG. 2. Alternatively, embodiments may be employed on a combination of devices including, for example, those listed above. Accordingly, various embodiments may be embodied wholly at a device, (for example, the device 200 or by apparatuses in a client/server relationship). Furthermore, it should be noted that the apparatuses or elements described below may not be mandatory and thus some may be omitted in certain embodiments.

In an example embodiment, the apparatus 300 may enable compensating eye color defects. In an example embodiment, the apparatus 300 may be referred to as eye color defect compensating apparatus 300. The apparatus 300 includes or otherwise is in communication with at least one processor 302, at least one memory 304, a user interface 306, and a communication interface 308, and a decoder 310. Examples of the at least one memory 304 include, but are not limited to, volatile and/or non-volatile memories. Some examples of the volatile memory include, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 304 may be configured to store information, data, applications, instructions or the like for enabling the apparatus 300 to carry out various functions in accordance with various example embodiments. For example, the memory 304 may be configured to buffer input data for processing by the processor 302. Additionally or alternatively, the memory 304 may be configured to store instructions for execution by the processor 302.

The processor 302, which may be an example of the controller 208 of FIG. 2, may be embodied in a number of different ways. The processor 302 may be embodied as a multi-core processor, a single core processor; or combination of multi-core processors and single core processors. For example, the processor 302 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 304 or otherwise accessible to the processor 302. Alternatively or additionally, the processor 302 may be configured to execute hard coded functionality. As such, whether configured by hardware or software methods, or by a combination thereof, the processor 302 may represent an entity, for example, physically embodied in circuitry, capable of performing operations according to various embodiments while configured accordingly. Thus, for example, when the processor 302 is embodied as two or more of an ASIC, FPGA or the like, the processor 302 may be specifically configured hardware for conducting the operations described herein. Alternatively, as another example, when the processor 302 is embodied as an executor of software instructions, the instructions may specifically configure the processor 302 to perform the algorithms and/or operations described herein when the instructions are executed. However, in some cases, the processor 302 may be a processor of a specific device, for example, a mobile terminal or network device adapted for employing embodiments by further configuration of the processor 302 by instructions for performing the algorithms and/or operations described herein. The processor 302 may include, among other things, a clock, an arithmetic logic unit (ALU) and logic gates configured to support operation of the processor 302.

The user interface 306 may be in communication with the processor 302. Examples of the user interface 306, include but are not limited to, input interface and/or output interface. The input interface is configured to receive an indication of a user input. The output user interface may provide an audible, visual, mechanical or other output and/or feedback to a user. Examples of the input interface may include, but are not limited to, a keyboard, a mouse, a joystick, a keypad, a touch screen, soft keys, and the like. Examples of the input interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 306 may include, among other devices or elements, any or all of a speaker, a microphone, a display, and a keyboard, touch screen, or the like. In this regard, for example, the processor 302 may comprise user interface circuitry configured to control at least some functions of one or more elements of the user interface, such as, for example, a speaker, ringer, microphone, display, and/or the like. The processor 302 and/or user interface circuitry comprising the processor 302 may be configured to control one or more functions of one or more elements of the user interface 306 through computer program instructions, for example, software and/or firmware, stored on a memory, for example, at least one memory 304, and/or the like, accessible to the processor 302.

In an example embodiment, the processor 302 may be embodied as, include, or otherwise control, a decoder 310. The decoder 310 may be any means such as a device or circuitry operating in accordance with software or otherwise embodied in hardware or a combination of hardware and software. For example, the processor 302 operating under software control, the processor 302 embodied as an ASIC or FPGA specifically configured to perform the operations described herein, or a combination thereof, thereby configuring the apparatus or circuitry to perform the corresponding functions of the decoder 310.

In an embodiment, the processor 302 is configured to, with the content of the memory 304, and optionally with other components described herein, to cause the apparatus 300 to detect eye color defects, such as red eyes, at least one eye region containing an eye and neighborhood region thereof. In an example embodiment, an eye region may be detected by first detecting a location or region of the face, such as the face 102 in the image 100, and thereafter determining approximate location of the eyes, such as the eye 104 within the detected region of the face 102. In an example embodiment, the region of the face may be determined by using pattern recognition face detection technique. The orientation of the face may also be obtained using pattern recognition face detection technique.

In an embodiment, the processor 302 is configured to, with the content of the memory 304, and optionally with other components described herein, to cause the apparatus 300 to determine an approximate location of the eyes on the detected face region. Approximate regions of the eyes may be determined based on a face coordinates and a face orientation. In an example embodiment, the face region may be divided into four quadrants. For a frontal upright face, a top left quadrant and a top right quadrant may be assumed to contain candidate eyes, for example, a left eye and a right eye respectively. For each of the candidate eyes, processing may be performed separately for compensating eye color defect. A candidate eye may hereinafter be referred to as a first eye region. The first eye region may enclose a first set of pixels. The first set of pixels may be utilized for determining pixels corresponding to first eye color defect region.

In an example embodiment, the processor 302 is configured to perform processing on an image space derived from a RGB (Red Green Blue) bitmap. In another example embodiment, the processor 302 is configured to convert input data of images available in other formats into RGB format for processing. For example, the input data for an image in a YUV format may be first converted in the RGB format, and thereafter processed by the processor 302. In the RGB bitmap, the red regions of the image space may be highlighted and other regions may be suppressed. In an example embodiment, said image space may be derived by computing a difference image. In an example embodiment, the processor 302 is configured to, with the content of the memory 304, and optionally with other components described herein, to cause the apparatus 300 to compute a first difference image. In an example embodiment, the first different image is computed based on a difference between red pixel intensity and green pixel intensity of the set of pixels associated with the first eye region.

In this embodiment, the computation of the first difference image $d1(x,y)$ may be represented by a mathematical expression as follows $$d1(x,y)=[r(x,y)-g(x,y)]^2 \text{ if } r(x,y)>g(x,y), \quad (1),$$

else $d1(x,y)=0$
where $r(x,y)$ is the red pixel intensity at location $(x,y)$ in the image, and $g(x,y)$ denotes the green pixel intensity at the location $(x,y)$.

In another example embodiment, the first difference image $d1(x,y)$ may be computed as follows:

$$d1(x,y)=[r(x,y)-g(x,y)]^2/r(x,y) \text{ if } r(x,y)>g(x,y), \quad (2),$$

else $d1(x,y)=0$.

The use of expression (2) for calculation of the difference image has an advantage over the first expression (1) is that the expression (2) for calculation of the $d1(x,y)$ is more sensitive to slightly lighter hues of red. Since, the red in the eye color defect regions or the red eyes may have different shades, using multiple measures (and corresponding spaces) to detect them ensures a very high detection rate.

In another example embodiment, the first different image is computed based on a squared difference between red pixel intensity and maximum of green and blue pixel intensities of the set of pixels associated with a first eye region of the image. In this embodiment, the computation of the first difference image $d1(x,y)$ may be represented by following mathematical expressions:

$$d1(x,y)=[r(x,y)-\max(g(x,y),b(x,y))]^2 \text{ if } r(x,y)>\max(g(x,y),b(x,y)) \quad (3),$$

else $d1(x,y)=0$,
or $$d1(x,y)=[r(x,y)-\max(g(x,y),b(x,y))]^2/r(x,y) \text{ if } r(x,y)>\max(g(x,y),b(x,y)) \quad (4),$$

else $d1(x,y)=0$.

The advantage of using squared difference between the red pixel intensity and maximum of the green pixel and blue pixel intensity is that for those image regions where difference between the red pixel intensity and the green pixel intensity is high, such as eye color defects, the difference image intensity may have a lower value in the skin region.

In an embodiment, the first difference image $d1(x,y)$ so computed may be normalized to assume values in a range of 0 to 255.

In an example embodiment, the processor 302 is configured to, with the content of the memory 304, and optionally with other components described herein, to cause the apparatus 300 to process the first difference image for computing at least one gradient and at least one projection associated with the at least one gradient. In an example embodiment, a first order one dimensional gradient is computed in the x-direction as defined below:

$$Gx(x,y)=d1(x,y)-d1(x-1,y) \text{ if } r(x,y)>g(x,y)$$

$$Gx(x,y)=0 \text{ if } r(x,y)<=g(x,y).$$

The at least one vertical projections of the at least one gradient, such as the gradient $Gx$ may be computed as below:

$$Vp(x)=\Sigma abs(Gx(x,y)), \text{ where summation is over all } y, 1<=y<=\text{height}$$

In a similar manner, the first order one dimensional gradient Gy(x,y) in y-direction, and a horizontal projection Hp(y) associated with said gradient may be computed.

Though, the above embodiment is explained with the help of first order gradients, said embodiment may be explained or practiced with help of second order gradients, variance, and any other classifiers that may be used to measure differences/variation in values in the gradient images.

Based on the computed at least one projection, the processor 302 is configured to, with the content of the memory 304, and optionally with other components described herein, to cause the apparatus 300 to determine at least one central point. In an embodiment, the at least one central point may be obtained from the at least one projection. In an example embodiment, the at least one projection may include at least one peak, and a pixel location corresponding to the at least one significant peak constitutes the central point of the eye color defect region.

Figures 4A, 4B:
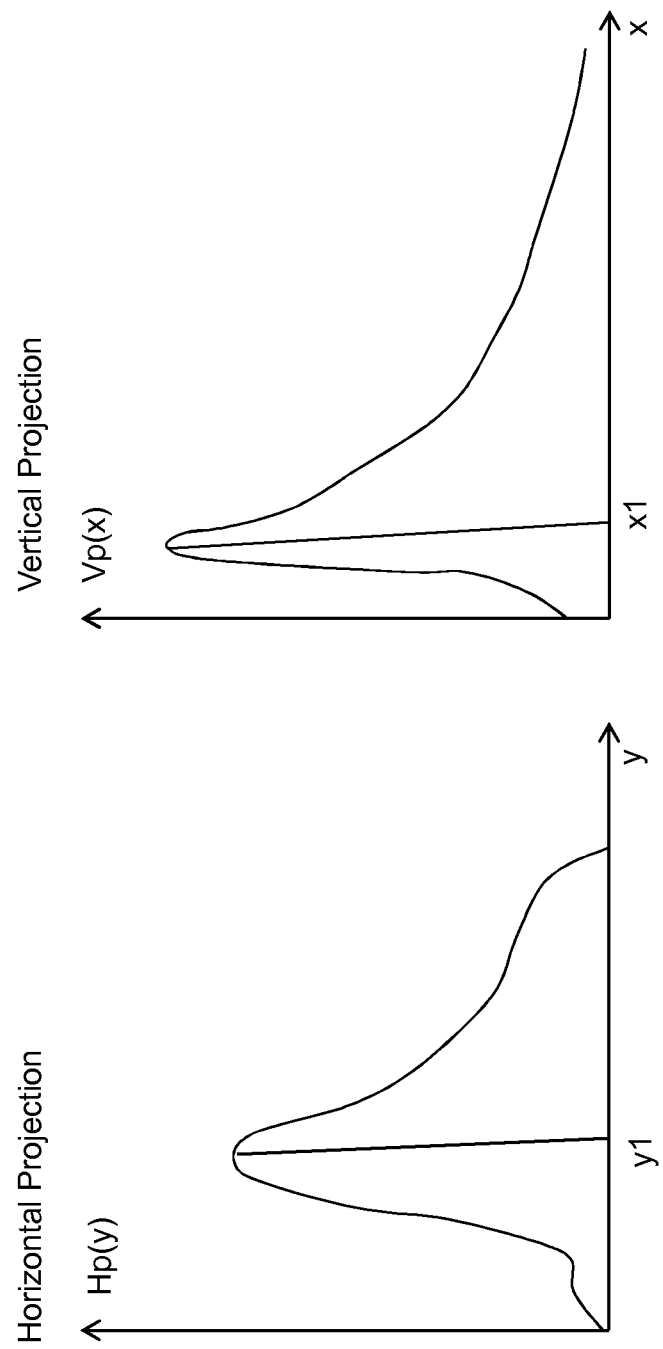
FIGS. 4A and 4B illustrate a horizontal projection and a vertical projection associated with at least one gradient in accordance with an example embodiment.

In an example embodiment, each of the horizontal projection and the vertical projection may include a single significant peak, as illustrated in FIGS. 4A and 4B, respectively. Particularly, FIGS. 4A and 4B illustrate a horizontal projection and a vertical projection associated with at least one gradient in accordance with an example embodiment.

In another example embodiment, the at least one projection may have more than one significant peak. For example, FIGS. 5A and 5B illustrate a horizontal projection and a vertical projection associated with at least one gradient in accordance with another example embodiment, wherein the horizontal projection includes two significant peaks while the vertical projection includes one significant peak. In such a case, there may exist two possible eye location candidates, say (x1,y1) and (x1,y2). For determining the central point in this case, a small region may be considered around both (x1,y1) and (x1,y2), and a maximum value of the difference image d1(x,y) may be determined in the region. A point having a higher maximum value of the d1(x,y) may be chosen to be the central point of the potential eye color defect region.

Using the central point and a plurality of red pixels of the first set of pixels, the processor 302 is configured to, with the content of the memory 304, and optionally with other components described herein, to cause the apparatus 300 to compute the first eye color defect region. In an embodiment, a region growing technique may be utilized for computing the first eye color defect region. For example, in one particular region growing technique, those pixels of the first difference image d1(x,y) may be considered that may have difference image pixel intensity greater than a particular predetermined threshold intensity. Such pixels may be connected to the first central point of the red eye region based on neighborhood connectivity to generate a connected region red eye region. In an example embodiment, the pixels may be connected based on eight neighborhood connectivity. In an alternate example embodiment, the pixels may be connected through 4-neighborhood connectivity. The connected region, so computed may be considered as the 'instance' of the eye color defect region, and may be verified for the characteristics of the eye color defect.

In an embodiment, the processor 302 is also configured to, with the content of the memory 304, and optionally with other components described herein, to cause the apparatus 300 to perform one or more verifications of the presence of a first eye color defect in the first eye color defect region. In an example embodiment, the one or more verifications may be based on pixel intensities at the first eye color defect region. In an example embodiment, the one or more verifications may be performed by a smallest bounding rectangle technique, wherein the computed eye color defect region may be enclosed in a smallest bounding rectangle. A neighborhood region of the smallest bounding rectangle may be divided into a plurality of regions (N), and thereafter it may be determined whether the smallest bounding rectangle is at a border of the first eye color defect region. If the smallest bounding rectangle is determined to be present at a border of the selected eye defect region, then a subsequent pass may be performed to detect the presence of the eye color defect at the computed eye color defect region. However, if it is determined that the smallest bounding rectangle is not present at the border of the red eye region, then an average pixel intensity of each of the neighbouring regions of the smallest bounding rectangle are computed. Also, a number (Nr1) of neighbourhood regions having average pixel intensity of the difference image d1(x,y) lesser than a predetermined fraction of the average pixel intensity of the enclosed first eye color defect region is computed, and subsequently Nr1 is compared with a predetermined threshold number of neighbourhood regions. If the value of Nr1 is determined to be greater than the predetermined threshold number of neighbourhood regions, then a presence of the eye color defect at the computed first eye color defect region may be determined, and thereafter a subsequent verification of the computed first eye color region may be performed.

In an example embodiment, the processor 302 is configured to, with the content of the memory 304, and optionally with other components described herein, to cause the apparatus 300 to perform one or more verifications of the eye color defect region based on a shape thereof.

In an example embodiment, the processor 302 is configured to, with the content of the memory 304, and optionally with other components described herein, to cause the apparatus 300 to determine a confidence indicator for indicating presence of the first eye color defect at the computed first eye color defect region. In an example embodiment, the confidence indicator may be defined as a ratio of Nr1/N. If the confidence indicator is determined to be more than a first predetermined threshold, presence of the first eye color defect in the first eye color defect region is indicated. In an example embodiment, the first predetermined threshold is 0.75. However, if the confidence indicator is determined to be less than a second predetermined threshold, absence of the first eye color defect in the first eye color defect region is indicated. In an example embodiment, the second predetermined threshold is 0.33.

In an embodiment, a subsequent pass may be performed upon determining the value of the confidence indicator to lie between the first predetermined threshold and the second predetermined threshold. In an example embodiment, the second pass may be performed on a second set of pixels associated with a second eye region. The second eye region may be obtained by expanding boundaries of the first eye region. In the second pass, a second difference image d1(x,y) may be computed based on the squared difference between red pixel intensity and a maximum of green pixel and blue pixel intensities in the second eye region to the red pixel intensity, and an intensity level of the second set of pixels, in one embodiment. In another embodiment, the second difference image d1(x,y) may be computed based on the ratio of the squared difference between red pixel intensity and maximum of green pixel and blue pixel intensities in the second eye region to the red pixel intensity, and an intensity level of the second set of pixels. In an example embodiment, a weighting function, p(r(x,y)), also known as precision function may be used for calculating the second difference image d2(x,y). The precision function may be designed such that its value is small for low intensity pixels and is larger for high intensity pixels, thereby facilitating in reducing false detection in low intensity regions.

During the second pass, a high value of the confidence indicator indicates that the second eye color defect region computed in the second pass possesses the eye color defect. However, in case the confidence indicator is low, then the second eye color defect region may not correspond to the eye color defect. In such a scenario, if the projection is determined include two peaks, then a new eye color defect region may be grown using another central point corresponding to second peak, and may be verified for the presence of an eye color defect thereat.

In an embodiment, the processor 302 is configured to, with the content of the memory 304, and optionally with other components described herein, to cause the apparatus 300 to correct the first eye color defect.

In an example embodiment, the image is a low resolution (LR) image. However, in certain applications, the resolution of the image may be high, and accordingly, detection of the eye color defect and correction thereof in a HR image is relatively complex and time consuming. In such a scenario, the detection of the eye color defect may be performed in the LR image, and correction thereof may be performed at the HR image.

Figure 6:
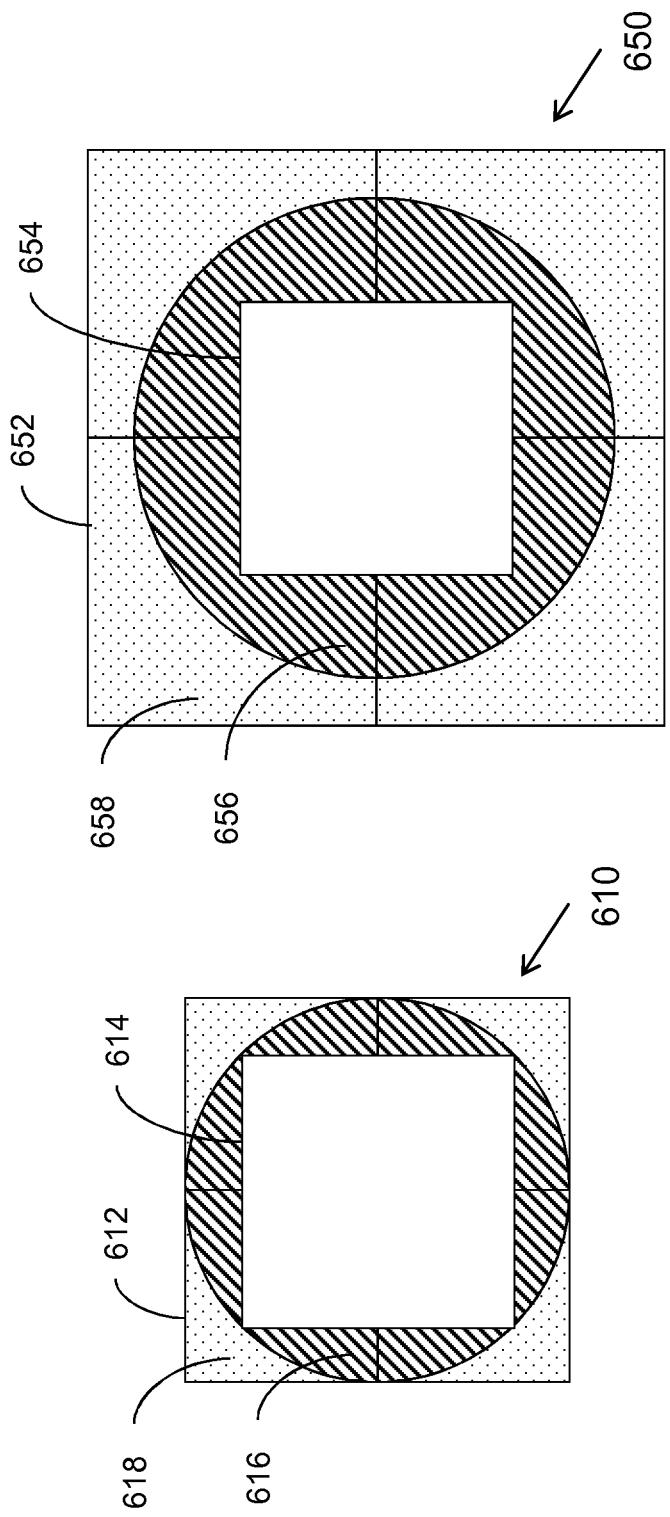
FIG. 6 is a block diagram illustrating eye color defects in a low resolution (LR) image and a corresponding high resolution (HR) image, in accordance with an example embodiment.

FIG. 6 is a block diagram illustrating eye color defects in a LR image and the corresponding eye color defect in the HR image, in accordance with an example embodiment. Typically, in an image capturing device such as a camera, it is often desirable that correction be done on both the high and low resolution images, with the HR image being saved in the memory and the LR image being shown on the viewfinder.

Referring to FIG. 6, an eye color defect in a LR image 610, and a corresponding eye color defect in a HR image 650 are illustrated. The LR image 610 includes an eye color defect region (shown as shaded inclined lines). In an embodiment, the processor 302 is configured to, with the content of the memory 304, and optionally with other components described herein, to cause the apparatus 300 to determine a first rectangle 612 circumscribing the first eye color defect region, and a second rectangle 614 inscribing the first eye color defect region in the LR image 610. The second rectangle 614 is representative of an inner part of the eye color defect region. The regions between the first rectangle 612 and the second rectangle 614 may be divided into a plurality of regions, for example four quadrants. In an example embodiment, each of the four quadrants may have an eye color defect portion, such as a portion 616 and a non defect eye portion, such as a portion 618. Such plurality of portions corresponding to the four quadrants may hereinafter be collectively referred to a first plurality of peripheral regions.

In an embodiment, the processor 302 is configured to, with the content of the memory 304, and optionally with other components described herein, to cause the apparatus 300 to determine an eye color defect information for the LR image. In an example embodiment, the eye color defect information includes a set of identifiers associated with the plurality of first peripheral portions of the first eye color defect region in LR image. In an example embodiment, the value of the set of identifiers includes average intensity values of the at least one eye color defect portion and the at least one non-defect eye portion. Accordingly, in the present embodiment, the set of identifiers may include eight intensity values, four of the intensity values corresponding to four eye color defect portions (such as the portion 616), and four of the intensity values corresponding to the four non-defect eye portions (such as the portion 618) of the first eye color defect region.

In an embodiment, the processor 302 is configured to, with the content of the memory 304, and optionally with other components described herein, to cause the apparatus 300 to convert the LR image to the HR image. In another example embodiment, the processor 302 is configured to, with the content of the memory 304, and optionally with other components described herein, to cause the apparatus 300 to map the eye color defect information computed from the LR image to be applicable on the HR image. In an example embodiment, during the conversion, the first rectangle 612 and the second rectangle 614 associated with the LR image 610 may be expanded to a first rectangle 652 and a second rectangle 654 associated with the HR image 650, as illustrated in FIG. 6. The second rectangle 654 represents an inner part of the eye color defect region in the HR image. However, upon conversion, the first rectangle 652 and the second rectangle 654 associated with the HR image 650 may not touch the eye color defect region in a manner similar to the LR image 610 due to scaling. Accordingly, the first rectangle 652 may be far too bigger than the eye color defect region, and the second rectangle 654 may be far too smaller than the eye color defect region in the HR image. Also, the eye color defect portions such as the portion 616 and the non-defect eye portions such as the portion 618 of the LR image 610 may be expanded to an eye color defect portion such as a portion 656 and a non-defect eye portion 658 in the HR image 650.

In an embodiment, the processor 302 is also configured, with the content of the memory 304, and optionally with other components described herein, to cause the apparatus 300 to process the HR image 650. The HR image 650 may be processed by comparing difference image pixel intensity of the plurality of second peripheral portions with average difference image intensity values computed from the LR image 610. In an example embodiment, a second peripheral portion of the plurality of second peripheral portions may be determined to constitute an eye color defect when the difference image pixel intensity of the second peripheral portion in the HR image 650 is closer to the average difference image intensity value of the corresponding eye color defect portion than the average difference image intensity of the corresponding non-defect eye portion in the LR image 610.

In an embodiment, the processor 302 is also configured, with the content of the memory 304, and optionally with other components described herein, to cause the apparatus 300 to correct the eye color defect.

Figure 7:
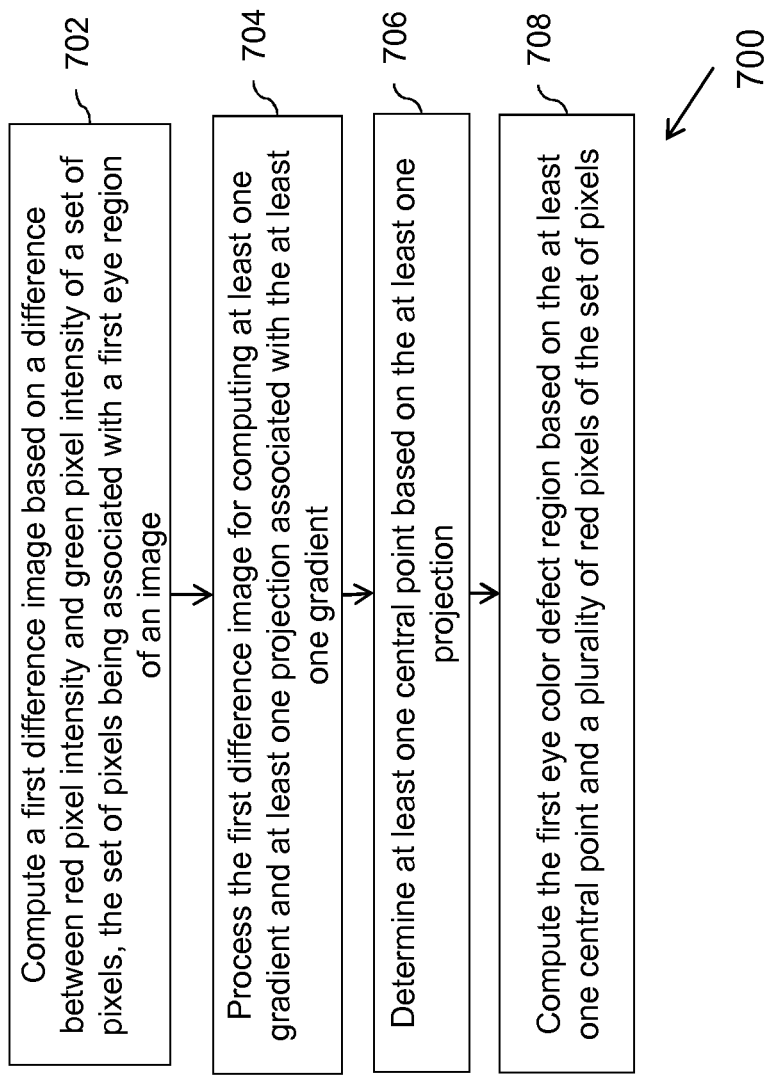
FIG. 7 is a flowchart depicting an example method for compensating eye color defects in images in accordance with an example embodiment.

FIG. 7 is a flowchart depicting an example method 700 for compensating eye color defects in an image, such as the image 100, in accordance with an example embodiment. The method depicted in flow chart may be executed by, for example, the apparatus 300 of FIG. 3. In an embodiment, the image 100 may be a LR image.

At block 702, a first difference image is computed. In an example embodiment, the first difference image is computed based on a difference between red pixel intensity and green pixel intensity of a set of pixels. In another example embodiment, the first difference image is computed based on a squared difference between red pixel intensity and a maximum of green pixel and blue pixel intensity of the set of pixels. The set of pixels are the pixels associated with a first eye region of the LR image. The first difference image may be indicative of an eye color defect region in the first eye region.

At block 704, the first difference image is processed for computing at least one gradient and at least one projection associated with the at least one gradient. In an example embodiment, the at least one projection includes at least one horizontal projection and at least one vertical projection associated with the at least one gradient. In an example embodiment, the at least one gradient may be first order one dimensional gradient. Alternatively, the at least one gradient may include second order gradients, variance, and the like.

At block 706, at least one central point is determined based on the at least one projection. In an example embodiment, a first order gradient in x-direction and a first order gradient in y-direction may be computed, and thereafter a vertical projection and a horizontal projection associated with said gradients may be computed. In an embodiment, the vertical projection and the horizontal projection may include at least one significant peak, wherein a pixel location corresponding to the at least one significant peak is at least one central point of the eye color defect region in the image. In an example embodiment, the at least one projection may have only one significant peak, as illustrated in FIGS. 5A and 5B. However, in certain instances, the at least one projection may have multiple peaks, for example as illustrated in FIG. 6A. In such a scenario, there may exist two possible eye location candidates, say (x1,y1) and (x1,y2). For determining the central point in this case, a small region may be considered around both (x1,y1) and (x1,y2), and a maximum value of the difference image d1(x,y) may be determined in the region. A point having a higher maximum value of the d1(x,y) may be chosen to be the central point of the potential eye color defect region.

Upon determining the central point of the potential eye color defect region, the first eye color defect region is computed based on the computed central point and a plurality of red pixels of the first set of pixels at block 808. In an example embodiment, the eye color defect region may be computed by utilizing a region growing technique.

In an example embodiment, a confidence indicator may be determined. The confidence indicator may be indicative of the presence of a first eye color defect at the computed first eye color defect region. In an embodiment, when the value of the confidence indicator is determined to be more than a first predetermined threshold, the presence of the first eye color defect in the first eye color defect region is indicated. In another example embodiment, when the value of the confidence indicator is less than a second predetermined threshold, an absence of the first eye color defect in the first eye color defect region is indicated. In yet another example embodiment, a subsequent pass may be performed when the value of the confidence indicator is determined to lie between the first predetermined threshold and the second predetermined threshold.

In an embodiment, one or more verifications of the presence of a first eye color defect at the first eye color defect region may be performed upon determining the first eye color defect region. In an example embodiment, the one or more verifications may be performed based on smallest bounding rectangle method. In alternate example embodiment, the one or more verification may be performed based on the shape of the eye color defect region.

In an embodiment, the eye color defect detected at the first eye color region in the image may be corrected. In an example embodiment, the eye color defect may be corrected by replacing the red pixels associated with the eye color defect with natural eye color pixels, such as a natural blackcolored pixels.

In an embodiment, the eye color defect information from the LR image may be mapped to a HR image, and the eye color defect detected in the LR image may be corrected in the HR image. A method for compensating eye color defect by converting the LR image to the HR image is explained in conjunction with FIG. 8.

Figure 8:
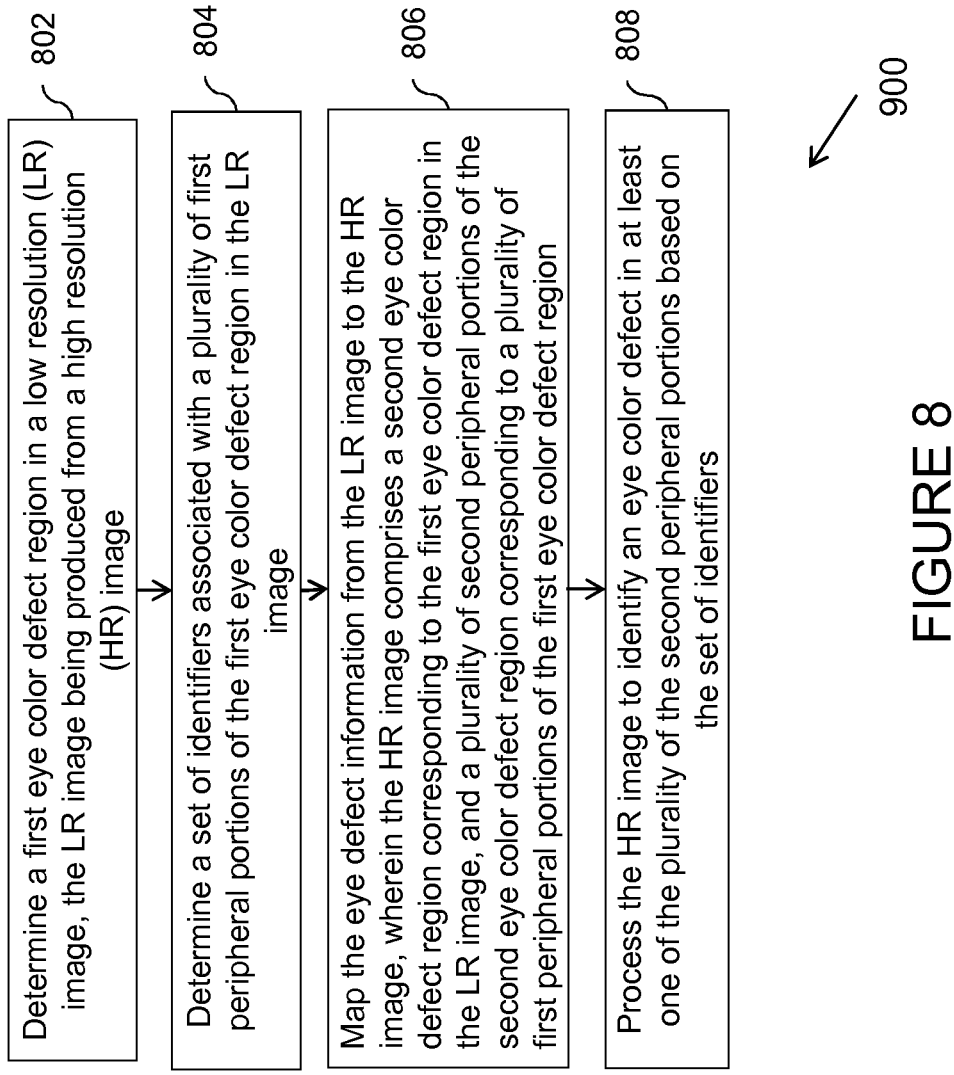
FIG. 8 is a flowchart depicting an example method for compensating eye color defects in images in accordance with another example embodiment.

FIG. 8 is a flowchart depicting an example method 800 for compensating eye color defects in images in accordance with another example embodiment. At block 802, an eye color defect region may be determined in a LR image (A method for detecting eye color defect in the LR image is explained in conjunction with FIG. 7). In an embodiment, the LR image may be produced from a HR image.

At block 804, an eye color defect information for the LR image may be determined. In an example embodiment, the eye color defect information includes a set of identifiers determined for the eye color defect region identified in the LR image (as explained in FIG. 6). The set of identifiers may be associated with a plurality of first peripheral portions of the first eye color defect region in the LR image. In an example embodiment, the set of identifiers may include the difference image average intensity values of the at least one eye color defect portion and the at least one non-defect eye portion in the LR image.

At block 806, the eye defect information from the LR image may be mapped into a HR image. The HR image may include a second eye color defect region corresponding to the first eye color defect region in the LR image, and a plurality of second peripheral portions of the second eye color defect region corresponding to the plurality of first peripheral portions of the first eye color defect region.

At block 808, the HR image may be processed to identify an eye color defect in at least one of the plurality of second peripheral portions based on the set of identifiers. In an example embodiment, processing the HR image comprises comparing the difference image pixel intensity of the plurality of second peripheral portions with the corresponding average difference image intensity computed from the LR image. In an example embodiment, a second peripheral portion of the plurality of second peripheral portions may be determined as the eye color defect if the difference image pixel intensity of the second peripheral portion in the HR image is closer to the average difference image intensity value of the corresponding at least one eye color defect portion than the average difference image intensity of the corresponding non-eye color defect portion in the LR image.

In an embodiment, the detected eye color defect in the HR image may be corrected. In an example embodiment, the correction of the eye color defect in the HR image includes replacing the pixels corresponding to the eye defect with pixels corresponding to the natural eye color in the HR image.

Without in any way limiting the scope, interpretation, or application of the claims appearing below, a technical effect of one or more of the example embodiments disclosed herein is to compensate eye color defects in an image. Another technical effect of one or more of the example embodiments disclosed herein is to detect eye color defects in a LR image and thereafter correct the detected eye color defects in the LR image. Another technical effect of one or more of the example embodiments disclosed herein is to detect the eye color defects in the LR image and thereafter correct the detected eye color defect in the HR image. Yet another technical effect of one or more of the example embodiments disclosed herein is to compensate for eye color defects in a very accurate manner. Also since the redness property of the eye color defects is used herein, complexity in determining the eye color defect is significantly reduced. Also, using multiple passes for different measures ensures that eye color defects of all hues and shades may be reliably detected, ensuring a very high detection rate. The confidence score from each pass also enables early exits in case it is known at any stage that the computed eye color defect region cannot be an eye color defect with high confidence, thereby reducing computational complexity.

Methods and apparatuses are provided that may enable a choice between multiple eye candidates in an eye region when the projections have multiple significant peaks. Also, for cases where eye color defect removal needs to be done on a very high resolution image, a method is proposed to perform the detection in lower resolution and utilize the result to perform the correction in the higher resolution very efficiently and accurately.

Various embodiments described above may be implemented in software, hardware, application logic or a combination of software, hardware and application logic. The software, application logic and/or hardware may reside on at least one memory, at least one processor, an apparatus or, a computer program product. If desired, part of the software, application logic and/or hardware may reside on a device detecting the eye color defect, part of the software, application logic and/or hardware may reside on a device correcting the eye color defect. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in herein. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. A method comprising:
computing a first difference image based on a difference between red pixel intensity and green pixel intensity of a set of pixels, the set of pixels being associated with a first eye region of an image, wherein the first eye region comprises a plurality of quadrantal regions; and the set of pixels comprise at least one pixel of an eye color defect region of at least one of the plurality of quadrantal regions of the first eye region and at least one pixel from a non-defect eye portion of the at least one of the plurality of quadrantal regions of the first eye region;
processing the first difference image for computing at least one gradient and at least one projection associated with one or more gradient, wherein the one or more gradient comprises a first order gradient in a first direction and a first order gradient in a second direction different than the first direction;
determining at least one central point based on the at least one projection; and
computing the first eye color defect region based on the at least one central point and a plurality of red pixels of the set of pixels.

2. The method of claim 1, wherein the image is a low resolution (LR) image.

3. The method of claim 1, wherein the at least one projection comprises at least one horizontal projection, and at least one vertical projection associated with the at least one gradient.

4. The method of claim 1, wherein determining the at least one central point comprises determining at least one significant peak of the at least one projection, and wherein a pixel location corresponding to the at least one significant peak is the at least one central point of the first eye color defect region.

5. The method of claim 1 further comprising performing one or more verifications of a presence of a first eye color defect in the first eye color defect region when the first eye color defect region is computed.

6. The method of claim 5 further comprising determining a confidence indicator for indicating presence of the first eye color defect at the first eye color defect region,
wherein the first eye color defect is determined to be present in the first eye color defect region when the confidence indicator is more than a first predetermined threshold, and
wherein the first eye color defect is determined to be absent in the first eye color defect region when the confidence indicator is less than a second predetermined threshold.

7. A method comprising:
determining a first eye color defect region in a low resolution (LR) image, the LR image being produced from a high resolution (HR) image, wherein the first eye color defect region comprises a plurality of quadrantal regions;
determining an eye color defect information for the LR image, the eye color defect information comprising a set of identifiers associated with a plurality of first peripheral portions of the first eye color defect region in the LR image, wherein the set of identifiers comprises at least one intensity value of an eye defect portion of at least one of the plurality of quadrantal regions of the first eye color defect region and at least one intensity value of a non-defect eye portion of the at least one of the plurality of quadrantal regions of the first eye color defect region;
mapping the eye color defect information computed from the LR image to be applicable on the HR image, the HR image comprising:
a second eye color defect region corresponding to the at least one of the plurality of quadrantal regions of the first eye color defect region in the LR image; and
a plurality of second peripheral portions of the second eye color defect region corresponding to a plurality of first peripheral portions of the first eye color defect region; and
processing the HR image to identify an eye color defect in at least one of the plurality of the second peripheral portions based on the set of identifiers.

8. An apparatus comprising:
at least one processor; and
at least one memory comprising computer program code, the at least one memory and the computer program code configured to, with the at least one processor, cause the apparatus at least to:
compute a first difference image based on a difference between red pixel intensity and green pixel intensity of a set of pixels, the set of pixels being associated with a first eye region of an image, wherein the first eye region comprises a plurality of quadrantal regions; and the set of pixels comprise at least one pixel of an eye color defect region of at least one of the plurality of quadrantal regions of the first eye region and at least one pixel from a non-defect eye portion of the at least one of the plurality of quadrantal regions of the first eye region;

process the first difference image for computing at least one gradient and at least one projection associated with one of more gradient, wherein the one or more gradient comprises a first order gradient in a first direction and a first order gradient in a second direction different than the first direction;

determine at least one central point based on the at least one projection; and compute the first eye color defect region based on the at least one central point and a plurality of red pixels of the set of pixels.

9. The apparatus of claim 8, wherein the image is a low resolution (LR) image.

10. The apparatus of claim 8, wherein the at least one projection comprises at least one horizontal projection, and at least one vertical projection associated with the at least one gradient.

11. The apparatus of claim 8, wherein the apparatus is further caused, at least in part, to determine the at least one central point by determining at least one significant peak of the at least one projection, and wherein a pixel location corresponding to the at least one significant peak being the at least one central point of the first eye color defect region.

12. The apparatus of claim 8, wherein the apparatus is further caused, at least in part, to perform one or more verifications of a presence of a first eye color defect in the first eye color defect region when the first eye color defect region is computed.

13. The apparatus of claim 12, wherein the apparatus is further caused, at least in part, to determine a confidence indicator for indicating presence of a first eye color defect at the first eye color defect region, wherein the first eye color defect is determined to be present in the first eye color defect region when the confidence indicator is more than a first predetermined threshold, and wherein the first eye color defect is determined to be absent in the first eye color defect region when the confidence indicator is less than a second predetermined threshold.

14. An apparatus comprising:

at least one processor; and at least one memory comprising computer program code, the at least one memory and the computer program code configured to, with the at least one processor, cause the apparatus at least to:

determine a first eye color defect region in a low resolution (LR) image, the LR image being produced from a high resolution (HR) image, wherein the first eye color defect region comprises a plurality of quadrantal regions;

determine an eye color defect information for the LR image, the eye color defect information comprising a set of identifiers associated with a plurality of first peripheral portions of the first eye color defect region in the LR image, wherein the set of identifiers comprises at least one intensity value of an eye defect portion of at least one of the plurality of quadrantal regions of the first eye color defect region and at least one intensity value of a non-defect eye portion of the at least one of the plurality of quadrantal regions of the first eye color defect region;

map the eye color defect information computed from the LR image to be applicable on the HR image, the HR image comprising:

a second eye color defect region corresponding to the at least one of the plurality of quadrantal regions of the first eye color defect region in the LR image; and a plurality of second peripheral portions of the second eye color defect region corresponding to a plurality of first peripheral portions of the first eye color defect region; and process the HR image to identify an eye color defect in at least one of the plurality of the second peripheral portions based on the set of identifiers.

15. A computer program product comprising at least one non-transitory computer-readable storage medium, the non-transitory computer-readable storage medium comprising a set of instructions, which, when executed by one or more processors, cause an apparatus to at least perform:

computing a first difference image based on a difference between red pixel intensity and green pixel intensity of a set of pixels, the set of pixels being associated with a first eye region of an image, wherein the first eye region comprises a plurality of quadrantal regions; and the set of pixels comprise at least one pixel of an eye color defect region of at least one of the plurality of quadrantal regions of the first eye region and at least one pixel from a non-defect eye portion of the at least one of the plurality of quadrantal regions of the first eye region;

processing the first difference image for computing at least one gradient and at least one projection associated with one of more gradient, wherein the one or more gradient comprises a first order gradient in a first direction and a first order gradient in a second direction different than the first direction;

determining at least one central point based on the at least one projection; and computing the first eye color defect region based on the at least one central point and a plurality of red pixels of the set of pixels.

16. The computer program product of claim 15, wherein the image is a LR image.

17. The computer program product of claim 15, wherein the at least one projection comprises at least one horizontal projection, and at least one vertical projection associated with the at least one gradient.

18. The computer program product of claim 15, wherein the apparatus is further caused, at least in part, to determine the at least one central point by determining at least one significant peak of the at least one projection, and wherein a pixel location corresponding to the at least one significant peak being the at least one central point of the first eye color defect region.

19. The computer program product of claim 15, wherein the apparatus is further caused, at least in part, to perform one or more verifications of a presence of a first eye color defect in the first eye color defect region when the first eye color defect region is computed.

20. The computer program product of claim 19, wherein the apparatus is further caused, at least in part, to determine a confidence indicator for indicating presence of the first eye color defect at the first eye color defect region, wherein the first eye color defect is determined to be present in the first eye color defect region when the confidence indicator is more than a first predetermined threshold, and wherein the first eye color defect is determined to be absent in the first eye color defect region when the confidence indicator is less than a second predetermined threshold.

21. A computer program product comprising at least one non-transitory computer-readable storage medium, the non-transitory computer-readable storage medium comprising a set of instructions, which, when executed by one or more processors, cause an apparatus to at least perform:

determining a first eye color defect region in a low resolution (LR) image, the LR image being produced from a high resolution (HR) image, wherein the first eye color defect region comprises a plurality of quadrantal regions;

determining an eye color defect information for the LR image, the eye color defect information comprising a set of identifiers associated with a plurality of first peripheral portions of the first eye color defect region in the LR image, wherein the set of identifiers comprises at least one intensity value of an eye defect portion of at least one of the plurality of quadrantal regions of the first eye color defect region and at least one intensity value of a non-defect eye portion of the at least one of the plurality of quadrantal regions of the first eye color defect region;

mapping the eye color defect information computed from the LR image to be applicable on the HR image, the HR image comprising:

a second eye color defect region corresponding to the at least one of the plurality of quadrantal regions of the first eye color defect region in the LR image; and a plurality of second peripheral portions of the second eye color defect region corresponding to a plurality of first peripheral portions of the first eye color defect region; and processing the HR image to identify an eye color defect in at least one of the plurality of the second peripheral portion based on the set of identifiers.

\* \* \* \* \*